United States Patent
Takahashi et al.

(10) Patent No.: US 12,399,724 B2
(45) Date of Patent: Aug. 26, 2025

(54) DISPLAY CONTROL DEVICE FOR VEHICLE, VEHICLE DISPLAY DEVICE, VEHICLE, METHOD AND NON-TRANSITORY STORAGE MEDIUM

(71) Applicant: TOYOTA JIDOSHA KABUSHIKI KAISHA, Toyota (JP)

(72) Inventors: Junya Takahashi, Tokyo-to (JP); Masafumi Nishida, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 467 days.

(21) Appl. No.: 18/058,301

(22) Filed: Nov. 23, 2022

(65) Prior Publication Data

US 2023/0221964 A1 Jul. 13, 2023

(30) Foreign Application Priority Data

Jan. 12, 2022 (JP) ................................ 2022-003398

(51) Int. Cl.
*G06F 9/44* (2018.01)
*G06F 3/14* (2006.01)
*G06F 9/445* (2018.01)

(52) U.S. Cl.
CPC ............ *G06F 9/44505* (2013.01); *G06F 3/14* (2013.01)

(58) Field of Classification Search
None
See application file for complete search history.

(56) References Cited

U.S. PATENT DOCUMENTS

| | | |
|---|---|---|
| 2015/0205616 A1* | 7/2015 | Thai ...................... G06F 9/4401 345/542 |
| 2018/0210774 A1* | 7/2018 | Young ................. G06F 11/0751 |
| 2022/0100451 A1 | 3/2022 | Ino |
| 2022/0100574 A1 | 3/2022 | Nagano |
| 2023/0102579 A1 | 3/2023 | Liu et al. |

FOREIGN PATENT DOCUMENTS

| | | |
|---|---|---|
| CN | 111371875 A | 7/2020 |
| CN | 113326070 A | 8/2021 |
| JP | 2020201761 A | 12/2020 |
| JP | 2020201762 A | 12/2020 |

\* cited by examiner

*Primary Examiner* — Craig C Dorais
(74) *Attorney, Agent, or Firm* — Dickinson Wright, PLLC

(57) ABSTRACT

A display control device for a vehicle includes a memory, and at least processor. The at least one processor is coupled to the memory, is configured to execute a first OS, which carries out display control of a display device installed at a vehicle and viewed by a user of the vehicle, and a second OS that carries out display control of the display device and ensures time limits of execution times of commands, and, in a case in which there is a problem with or a possibility of a problem with display of the display device, carry out display by only control of the second OS at the display device.

9 Claims, 6 Drawing Sheets

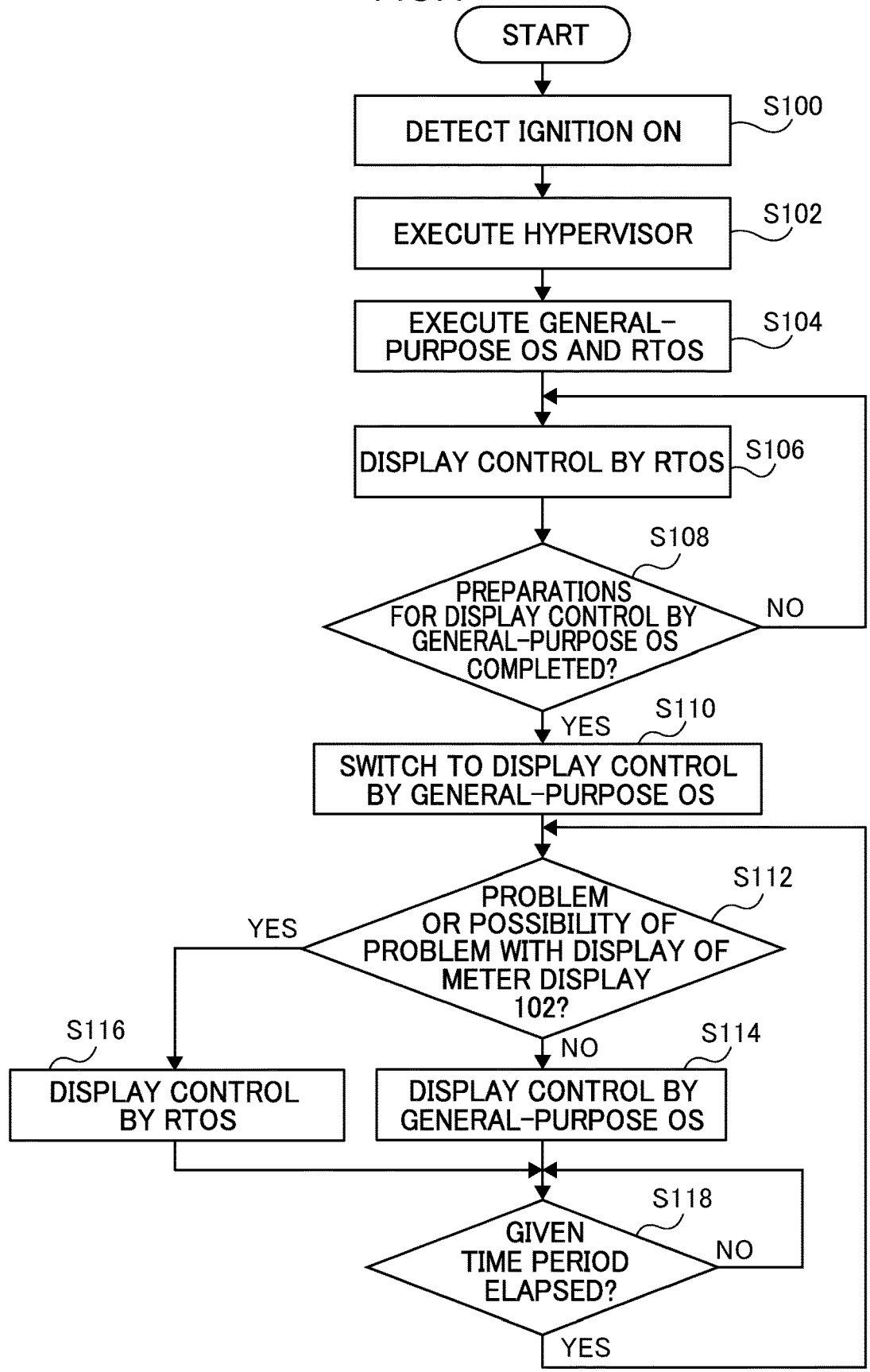

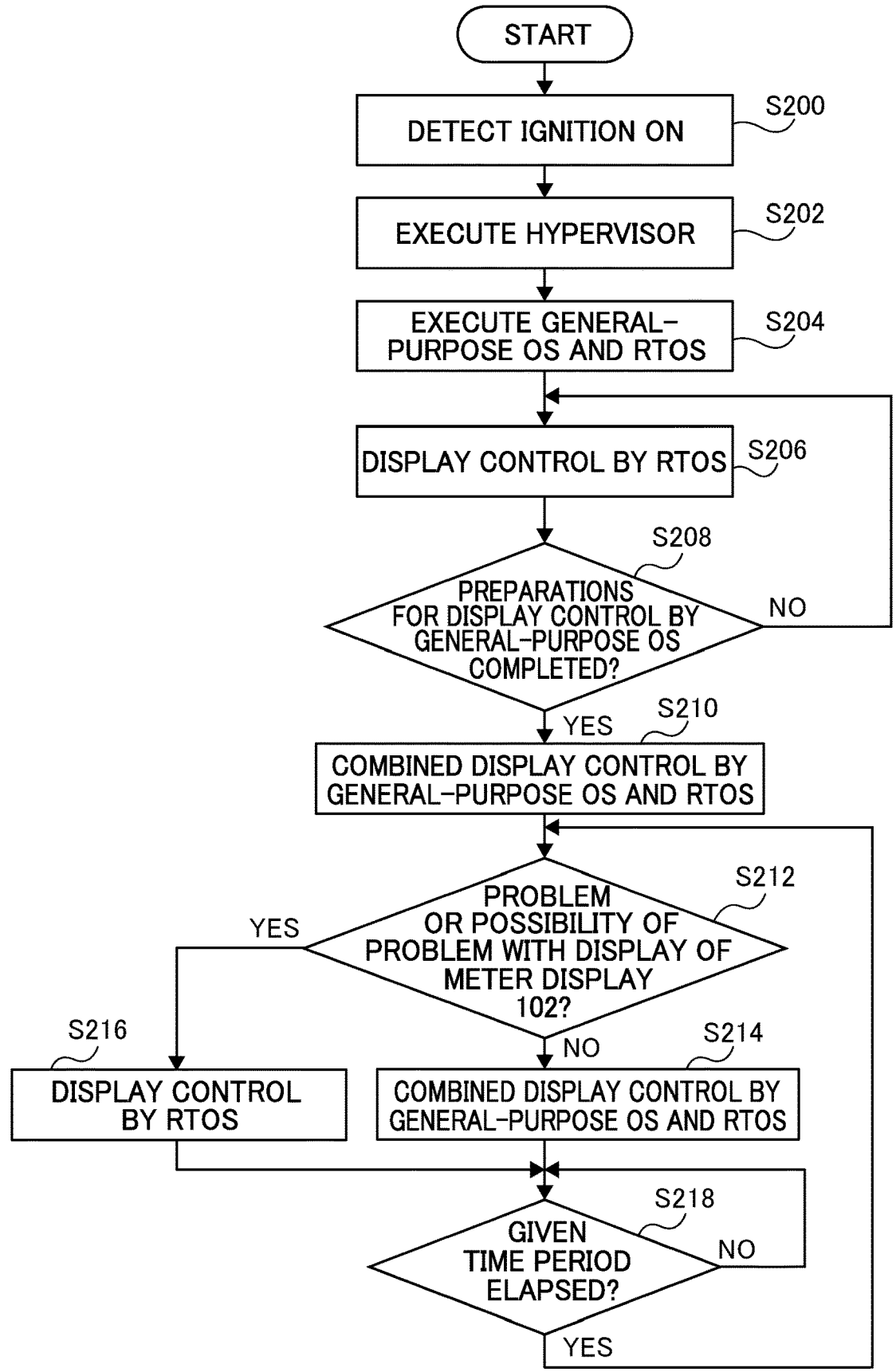

DISPLAY CONTROL DEVICE FOR VEHICLE, VEHICLE DISPLAY DEVICE, VEHICLE, METHOD AND NON-TRANSITORY STORAGE MEDIUM

CROSS-REFERENCE TO RELATED APPLICATION

This application is based on and claims priority under 35 USC 119 from Japanese Patent Application No. 2022-003398 filed on Jan. 12, 2022, the disclosure of which is incorporated by reference herein.

BACKGROUND

Technical Field

The present disclosure relates to a display control device for a vehicle, a vehicle display device, a vehicle, a method and a non-transitory storage medium.

Related Art

Japanese Patent Application Laid-Open (JP-A) No. 2020-201761 for example discloses a control device for a vehicle that, at the time of start-up of an integrated ECU that carries out display control of a display within a vehicle cabin, carries out display control by, before start-up of the general-purpose OS, starting-up an RTOS (Real-Time Operating System) that generates preceding display elements that are to be displayed before start-up.

However, in the device disclosed in JP-A No. 2020-201761, there is room for improvement in devising display control in a case in which there is a problem or there is the possibility of a problem with display of the display device, after the display control at the general-purpose OS. In particular, in a vehicle display device, display for the user must always be ensured.

SUMMARY

The present disclosure provides a display control device for a vehicle, a vehicle display device, a vehicle, a method and a non-transitory storage medium that ensure the display for a user in a case in which display control for a display device installed at a vehicle is carried out by plural OSs.

A display control device for a vehicle of a first aspect includes a memory, and at least one processor connected to the memory, wherein the at least one processor is configured to execute a first OS, which carries out display control of a display device installed at a vehicle and viewed by a user of the vehicle, and a second OS that carries out display control of the display device and ensures time limits of execution times of commands, and, in a case in which there is a problem with or a possibility of a problem with display of the display device, carry out display by only control of the second OS at the display device.

In the display control device for a vehicle of the first aspect, display control of a display device installed at a vehicle is carried out by a processor executing a first OS and a second OS. The display device is configured to be able to be seen by a user.

In a case in which there is a problem with or the possibility of a problem with displaying by the display device, the at least one processor carries out display on the display device by only control by the second OS. Therefore, in accordance with the present structure, display for the user can be ensured in cases in which display control of a display device installed at a vehicle is carried out by plural OSs.

In a display control device for a vehicle of a second aspect, in the display control device for a vehicle of the first aspect, the at least one processor is configured be able to switch between display by control of the first OS and display by control of the second OS, and, in a case in which there is a problem with or a possibility of a problem with display of the display device, carries out display by control of the second OS instead of display by control of the first OS at the display device.

In the display control device for a vehicle of the second aspect, in a case in which there is a problem with or the possibility of a problem with displaying by the display device by the first OS, display for the user can be ensured by switching to display by the second OS.

In a display control device for a vehicle of a third aspect, in the display control device for a vehicle of the first aspect, the at least one processor is configured to be able to carry out superposed display of display by control of the first OS and display by control of the second OS at the display device, and, in a case in which there is a problem with or a possibility of a problem with display of the display device, stops display by control of the first OS at the display device.

In the display control device for a vehicle of the third aspect, in a case in which there is a problem with or the possibility of a problem with superposed display at the display device by the first OS and the second OS, display for the user can be ensured by switching to display by the second OS only. Further, in a case of carrying out display control by plural OSs, due to there no longer being the need to carry out control for displaying similar information, an improvement in efficiency at the time of manufacturing the manufactured product, and a reduction in the memory capacity for information, and the like are possible.

In a display control device for a vehicle of a fourth aspect, in the display control device for a vehicle of any one of the first aspect to the third aspect, in a case in which the problem disappears, the at least one processor is configured to carry out display by control of the first OS at the display device.

When carrying out display by control of the second OS only, there are cases in which constraints arise in the display for the user. However in accordance with the display control device for a vehicle of the fourth aspect, in a case in which a problem no longer is, the display is immediately returned to the display of before the problem arose, and constraints on the display for a user can thereby be kept to a minimum.

In a display control device for a vehicle of a fifth aspect, in the display control device for a vehicle of any one of the second aspect to the fourth aspect, the at least one processor is configured to acquire information as to whether or not there is a problem with or a possibility of a problem with display of the display device, from an external information processing device.

In the display control device for a vehicle of the fifth aspect, redundancy and accuracy improve because decentralization of the system is possible due to an external information processing device judging whether or not there is a problem or the possibility thereof with displaying by the display device.

A vehicle display device of a sixth aspect includes: the display device; and the display control device for a vehicle of any one of the first aspect to the fifth aspect.

In the vehicle display device of the sixth aspect, display control of a display device installed at a vehicle is carried out by a processor executing a first OS and a second OS. The display device is configured to be able to be seen by a user.

In a case in which there is a problem with or the possibility of a problem with displaying by the display device, the at least one processor carries out display on the display device by only control by the second OS. Therefore, in accordance with the present structure, display for the user can be ensured at the vehicle display device that has a display device.

A vehicle of a seventh aspect includes: the display device; and the display control device for a vehicle of any one of the first aspect to the fifth aspect.

In the vehicle of the seventh aspect, display control of a display device installed at a vehicle is carried out by a processor executing a first OS and a second OS. The display device is configured to be able to be seen by a user. In a case in which there is a problem with or the possibility of a problem with displaying by the display device, the at least one processor carries out display on the display device by only control by the second OS. Therefore, in accordance with the present structure, at the vehicle, display for the user can be ensured, and traveling safety can thereby be ensured.

A display control method for a vehicle of an eighth aspect executes, by a processor, processings of: executing a first OS, which carries out display control of a display device installed at a vehicle and viewed by a user of the vehicle, and a second OS that carries out display control of the display device and ensures time limits of execution times of commands; and, in a case in which there is a problem with or a possibility of a problem with display of the display device, carrying out display by only control of the second OS at the display device.

In the display control method for a vehicle of the eighth aspect, display control of a display device installed at a vehicle is executed by a processor executing a first OS and a second OS. The display device is configured to be able to be seen by a user. In a case in which there is a problem with or the possibility of a problem with displaying by the display device, the computer executes display on the display device by only control by the second OS. Therefore, in accordance with the present method, display for the user can be ensured in cases in which display control of a display device installed at a vehicle is carried out by plural OSs.

A non-transitory storage medium of a ninth aspect stores a program executable by a processor to perform a process. the process comprising: executing a first OS, which carries out display control of a display device installed at a vehicle and viewed by a user of the vehicle, and a second OS that carries out display control of the display device and ensures time limits of execution times of commands; and, in a case in which there is a problem with or a possibility of a problem with display of the display device, carrying out display by only control of the second OS at the display device.

In a program that is stored on the non-transitory storage medium of the ninth aspect, display control of a display device installed at a vehicle is executed by a processor executing a first OS and a second OS. The display device is configured to be able to be seen by a user. In a case in which there is a problem with or the possibility of a problem with displaying by the display device, the at least one processor has display carried out at the display device by only control by the second OS. Therefore, in accordance with the program that is stored on this non-transitory storage medium, display for the user can be ensured in cases in which display control of a display device installed at a vehicle is carried out by plural OSs.

In accordance with the present disclosure, display for a user can be ensured in cases in which display control of a display device installed at a vehicle is carried out by plural OSs.

BRIEF DESCRIPTION OF THE DRAWINGS

Exemplary embodiments of the present invention will be described in detail based on the following figures, wherein:

FIG. 4 is a flowchart explaining main portions of control operations of the electronic control unit of the vehicle display device relating to the first embodiment;

FIG. 6 is a flowchart explaining main portions of control operations of the electronic control unit of the vehicle display device relating to the modified example of the first embodiment.

DETAILED DESCRIPTION

Specific embodiments that apply the present disclosure are described in detail hereinafter with reference to the drawings. However, the present disclosure is not limited to the following embodiments. Further, the following description and the drawings are simplified when appropriate for clearer explanation.

In the present disclosure, a processor executes a first OS (Operating System), which carries out display control of a display device installed at the vehicle and viewed by a user of the vehicle, and a second OS that is an OS that carries out display control of the display device and ensures time limits on command execution times. In a case in which there is a problem with or the possibility of a problem with displaying by the display device, the at least one processor carries out display in accordance with the control of the second OS at the display device.

First Embodiment

Figure 1:
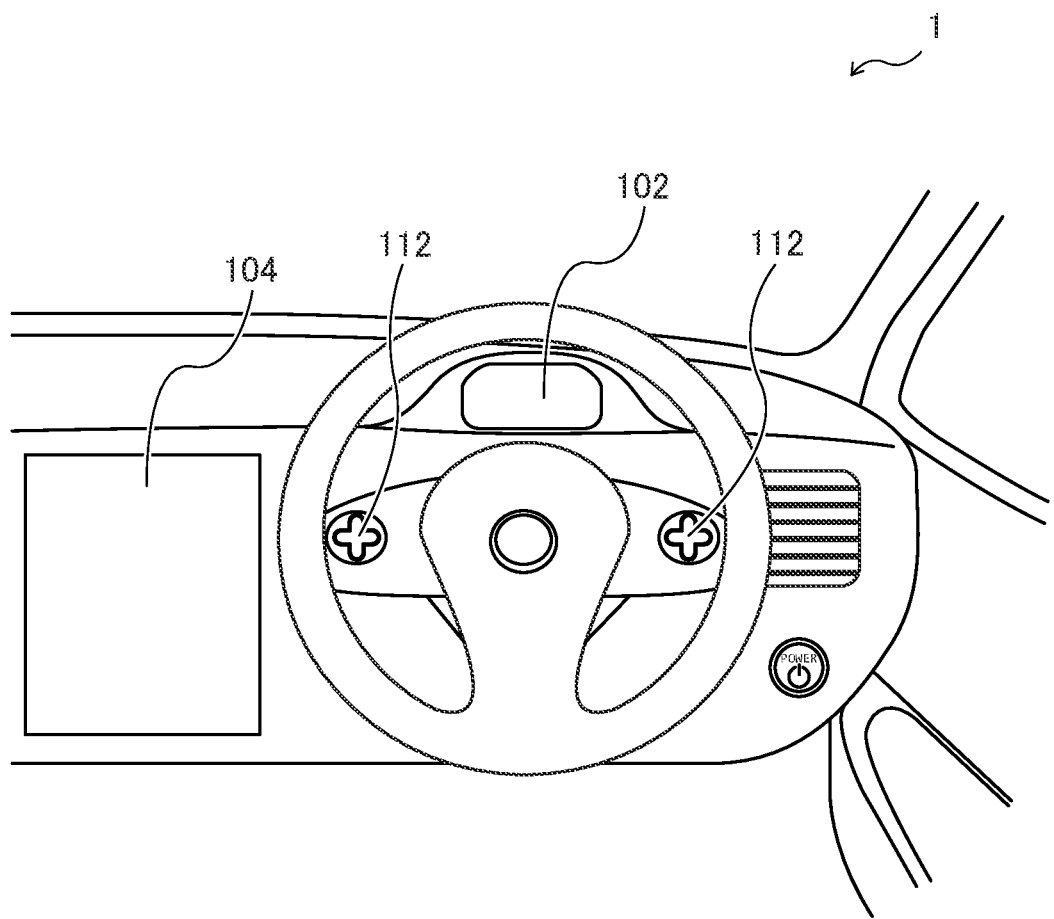
FIG. 1 is a schematic structural view of a vehicle that includes a vehicle display device relating to a first embodiment.

FIG. 1 is a schematic structural view of a vehicle 1 that includes a display device 10 for a vehicle relating to a first embodiment. As illustrated in FIG. 1, a meter display 102 is set so as to be within the visual field of a user of the vehicle 1. The meter display 102 is an example of the display device at the display device 10 for a vehicle, and any arbitrary display device that is installed at a vehicle, such as a head-up display or a center display or the like, may be used therefor.

(Hardware Structures of Display Device 10 for Vehicle)

Figure 2:
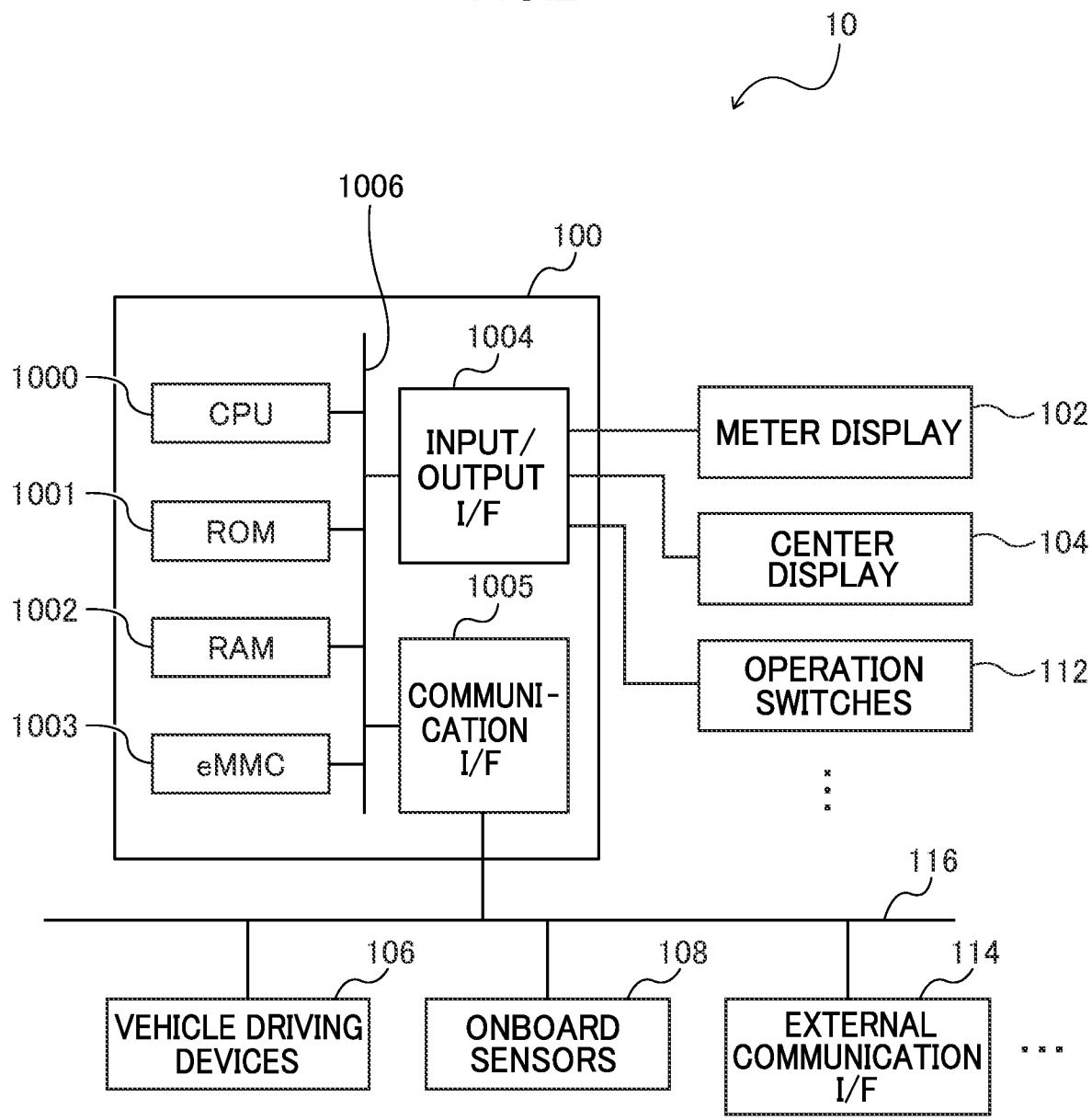
FIG. 2 is a block drawing illustrating hardware structures of the vehicle display device relating to the first embodiment.

FIG. 2 is a block drawing illustrating hardware structures of the display device 10 for a vehicle. As illustrated in FIG. 2, the display device 10 for a vehicle includes an electronic control unit (hereinafter called "ECU") 100, the meter display 102, a center display 104, operation switches 112, vehicle driving devices 106, onboard sensors 108, an external communication interface (external communication I/F) 114, and the like. The ECU 100 is an example of the display control device for a vehicle. At the display device 10 for a vehicle, the ECU 100 is connected to the meter display 102, the center display 104, the operation switches 112, various onboard switches and the like so as to be able to communicate therewith.

Further, the ECU 100 is connected by a CAN (Controller Area Network) bus 116 also to the vehicle driving devices 106, the onboard sensors 108, the external communication I/F 114, other ECUs, onboard equipment and the like so as to be able to communicate therewith.

The ECU 100 of the display device 10 for a vehicle has the function of carrying out display control of the meter display 102. The ECU 100 is structured to include a CPU (Central Processing Unit) 1000, a ROM (Read Only Memory) 1001, a RAM (Random Access Memory) 1002, an eMMC (embedded Multi Media Card) 1003, an input/output interface (input/output I/F) 1004 and a communication interface (communication I/F) 1005. These respective structures are connected so as to be able to communicate with one another through an internal bus 1006.

The CPU 1000 is a central computing processing unit, and executes various programs and controls the respective sections. Namely, the CPU 1000 reads-out programs from the ROM 1001 and the eMMC 1003, and executes the programs by using the RAM 1002 as a workspace. The CPU 1000 carries out control of the above-described respective structures, and various types of computing processings, in accordance with the programs stored in the ROM 1001 and the eMMC 1003. The CPU 1000 may be a multiprocessor, or may be a multicore processor. The CPU 1000 is an example of the processor.

The ROM 1001 stores various programs and various data. The RAM 1002 temporarily stores programs and data as a workspace. The eMMC 1003 is a non-transitory storage medium that stores various programs, including operating systems, and various data. In the present embodiment, an eMMC is used as the storage, but the storage may be structured by a storage device such as an HDD (Hard Disk Drive), an SSD (Solid State Drive), an SSHD (Solid State Hybrid Drive) or the like.

The input/output I/F 1004 is an interface for carrying out input/output of information from and to equipment connected at the exterior, and has a USB port, a DVI port or the like. The meter display 102, the center display 104, the operating switches 112, and various equipment that are installed at the vehicle, such as a touch pad, switches, a microphone, a camera and the like, are connected to the input/output I/F 1004. The ECU 100 is used also at the time of carrying out display control of the meter display 102.

The communication I/F 1005 is an interface for carrying out communication with other equipment installed at the vehicle 1. The vehicle driving devices 106, the onboard sensors 108, the external communication I/F 114, and other ECUs and onboard equipment and the like are connected to the communication I/F 1005 so as to be able to communicate therewith, by the CAN bus 116 that is a bus of the CAN standard. The communication standards may be changed appropriately, such as MOST, IDB-1394 or an onboard Ethernet® may be used in the transfer of large amounts of data such as digital content or the like, and a Local Interconnect Network (LIN) may be used in a system that does not require that high of a transfer speed, and the Safe-by-Wire standard that is low speed but highly reliable may be used in occupant protecting devices such as the airbags and seatbelts and the like, and the like.

The meter display 102 is a display device that is set at a position within the visual field of the user of the vehicle 1 who is in a driving posture. Due to display control being carried out by the ECU 100 through the input/output I/F 1004, the meter display 102 displays information for the user of the vehicle 1, and carries out vehicle operation assist. Further, the ECU 100 is connected to various meters that are installed at the vehicle. Therefore, information relating to various vehicle functions such as, first and foremost, the speed of the vehicle 1, the number of revolutions of the engine, the remaining fuel amount, the states of the gears and the battery, the display lights and the warning lights, and the like, are displayed on the meter display 102.

The center display 104 is a display device that is mounted in a vicinity of the vehicle transverse direction center of the instrument panel of the vehicle 1. In the same way as the meter display 102, due to display control being carried out by the ECU 100 through the input/output I/F 1004, the center display 104 displays information for the user of the vehicle 1, and carries out vehicle operation assist. The center display 104 has the function of displaying map information that guides the user to the destination, and news and weather information, and playing back music, and the like on the basis of signals inputted by the user of the vehicle 1. Further, the display control section of the center display 104 and the display control section of the meter display 102 may have information in common, or may coordinate information with one another by one of these display control sections providing, to the other, information that is the basis for preparing displayed images, such as map information of the periphery and the traveling state of the vehicle and the like, that are displayed on the respective displays.

The operation switches 112 are set at positions at which they can be operated by the user of the vehicle, and are used at the time when the user carries out changing of the displays of the meter display 102 and the center display 104, control of the audio system, and vehicle operations such as implementing/stopping the drive assist system and the like.

The vehicle driving devices 106 are devices for driving that are provided at the vehicle 1, and drive the vehicle 1 on the basis of signals inputted by the user. Namely, the vehicle driving devices 106 include motors, valves and actuators that are mounted to respective portions of the body and respective portions of the engine. These devices may be connected to the CAN bus 116 via ECUs used exclusively therefor.

The onboard sensors 108 are sensors provided at the vehicle 1, and are provided for the purpose of acquiring various information for the vehicle 1 and driving assist therefor. The onboard sensors 108 include sensors that are mounted to respective portions of the body and respective portions of the engine and the like of the vehicle 1. These sensors may be connected to the CAN bus 116 via ECUs used exclusively therefor.

The external communication I/F 114 is provided in order to carry out communication with external devices such as external centers or the like. Such communication includes the transmitting of information acquired from other onboard equipment through the CAN bus 116, and the receiving of information of the periphery of the vehicle and various service information such as maintenance information and the like, from external devices. The external communication I/F 114 has a communication module, and may carry out communication by wired or wireless communication using any of various standards such as, for example, CAN, Ethernet®, FDDI (Fiber Distributed Data Interface), Wi-Fi®, I2C (Inter-Integrated Circuit), Zigbee®, Bluetooth®, LTE (Long Term Evolution), and the like. Further, an arbitrary control unit may have the function of carrying out communications with the exterior. For example, the ECU 100 may be configured to also have the function of carrying out communications with the exterior.

(Functional Structures of Display Device for Vehicle Relating to Present Embodiment)

Figure 3:
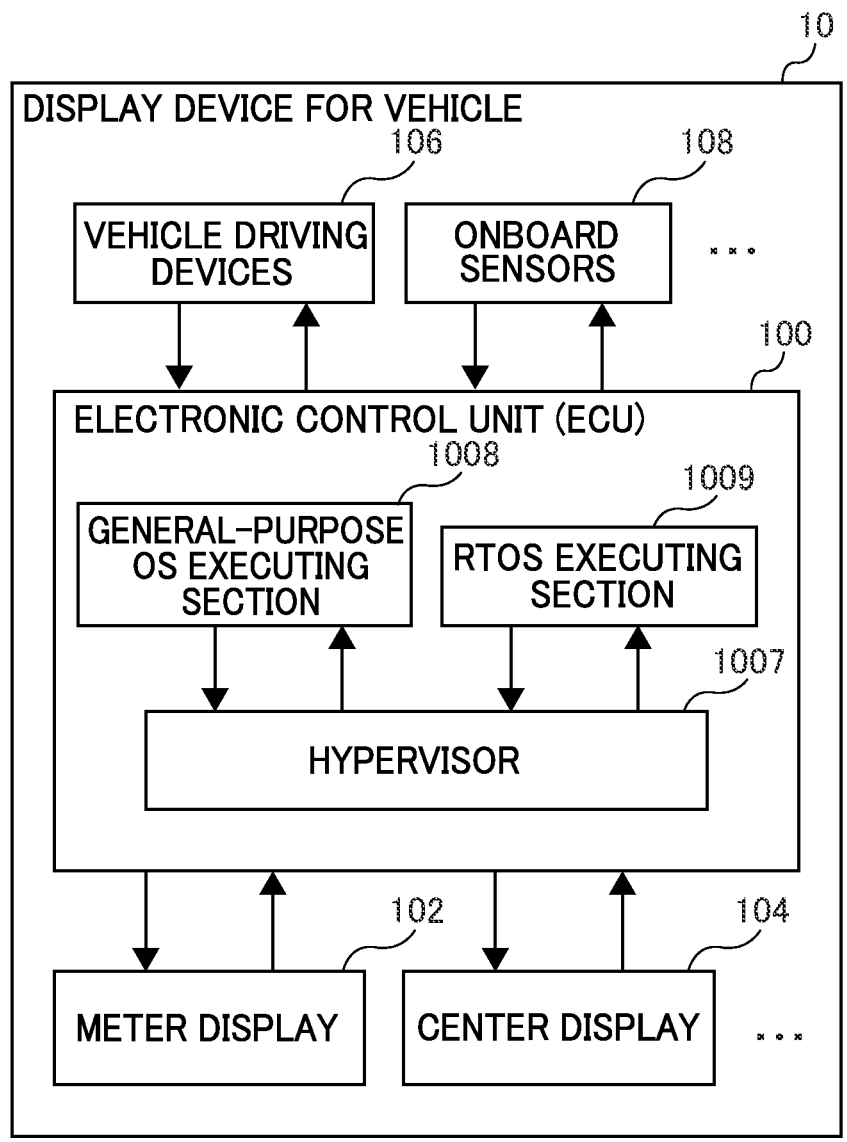
FIG. 3 is a block drawing illustrating functional structures of an electronic control unit of the vehicle display device relating to the first embodiment.

FIG. 3 is a block drawing illustrating functional structures of the vehicle display device relating to the first embodiment.

In the display device 10 for a vehicle that is provided at the vehicle 1, the ECU 100 carries out display control of the meter display 102 on the basis of information acquired from onboard equipment such as the vehicle driving devices 106, the onboard sensors 108, the external communication I/F 114, the center display 104, the operation switches 112 and the like.

A hypervisor 1007 functions due to a program that is stored in the ROM 1001 or the eMMC 1003 that is executed by the CPU 1000 by using the RAM 1002 as a workspace, at the time when the power is turned on. The hypervisor 1007 creates virtual machines on the hardware, and can operate the OSs. Specifically, hardware such as the CPU 1000, the ROM 1001, the RAM 1002, the eMMC 1003, the input/output I/F 1004, the communication I/F 1005 and the like are controlled on the basis of control that is intended by a guest OS operated at the hypervisor 1007. Further, the hypervisor 1007 always monitors the display of the meter display 102. The hypervisor 1007 is an example of the system that is used at the time when the CPU 1000 switches the OS that carries out display control of the meter display 102.

In the present embodiment, as an example of the first OS that is used as the guest OS, a general-purpose OS is used for operation of a display control application by which the ECU 100 carries out display control of the meter display 102. Further, an RTOS that is an OS that ensures the time limits of execution times of commands is used as an example of the second OS. Examples of the general-purpose OS are AGL (Automotive Grade Linux)®, AAOS (Android Automatic Operating System)® and the like. Examples of the RTOS are QNX®, μITRON®, RTLinux®, and the like. Further, in order to ensure the time limit of the execution time of a command, an OS is selected that fulfills requests from the user application, such as having a scheduling rule that ensures that a high-priority task, which fulfills a request for the worst case value until the processing routine is called, is reliably executed after the occurrence of a hardware interrupt that fulfills a request for the worst case value needed in a case in which a service call at which a wait does not arise is called, or the like.

The general-purpose OS is executed by a general-purpose OS executing section 1008, and operates the display control application of the meter display 102 on the system of the general-purpose OS that is executed. Further, similarly, the RTOS is executed by an RTOS executing section 1009, and operates the display control application of the meter display 102 on the system of the RTOS that is executed. In the display control of the meter display 102, both the display control application of the meter display 102 that is executed by the general-purpose OS executing section 1008 and the display control application of the meter display 102 that is executed by the RTOS executing section 1009 are always operating, and display control in accordance with the display control applications on the respective OSs is carried out by the hypervisor 1007 appropriately switching the OS on which the application that carries out the display control operates. Further, although the present embodiment is structured such that both applications are always operating, there may be a structure in which the applications are stopped temporarily, and the applications are executed again when needed.

Further, in the present embodiment, display control of the center display 104 is carried out similarly by the same hypervisor 1007, but may be carried out on different hardware. Further, the display control section may carry out communication, and, when information is shared, may use the information as display information.

(Flowchart Describing Main Portions of Control Operations)

FIG. 4 is a flowchart describing main portions of the control operations of the ECU 100 of the vehicle 1 relating to the first embodiment. The following processings are realized due to the CPU 1000 at the ECU 100 functioning as the hypervisor 1007, the general-purpose OS executing section 1008 and the RTOS executing section 1009.

The flowchart of FIG. 4 is executed each time the ignition of the vehicle 1 is turned on. First, in step S100 (the word "step" will be omitted hereinafter), the CPU 1000 detects that the ignition of the vehicle 1 has been turned on.

In S102, the CPU 1000 executes the hypervisor 1007. Specifically, when the ignition is turned on in S100 that is the previous step, and power is automatically supplied to the ECU 100 as well, the ECU 100 executes the hypervisor 1007 due to a control program stored in the eMMC 1003 that is executed by the CPU 1000 by using the RAM 1002 as a workspace.

In S104, the CPU 1000 executes the general-purpose OS and the RTOS. Specifically, the general-purpose OS and the RTOS are executed on the hypervisor 1007 that was executed in S102, and preparations for display control of the meter display 102 are carried out.

In S106, the CPU 1000 carries out display control of the meter display 102 by the RTOS. Specifically, when the RTOS is executed, and preparations for display control of the meter display 102 by the display control application on the RTOS are completed, display control of the meter display 102 by the RTOS is carried out.

In S108, the CPU 1000 judges whether or not preparations for display control by the general-purpose OS have been completed. Specifically, the CPU 1000 judges whether preparations for display control of the meter display 102 by the display control application that operates on the executed general-purpose OS have been completed. If the CPU 1000 judges that preparations for display control by the general-purpose OS have been completed (in the case of Yes in S108), the CPU 1000 advances to S110. On the other hand, if the CPU 1000 judges that preparations for display control by the general-purpose OS have not been completed (in the case of No in S108), the CPU 1000 returns to S106.

In S110, the CPU 1000 switches the OS that is carrying out display control to display control by the general-purpose OS. Namely, when preparations for display control by the general-purpose OS have been completed, the hypervisor 1007 switches the OS that carries out display control from display control by the RTOS to display control by the general-purpose OS.

In S112, the CPU 1000 judges whether or not there is a problem, or the possibility of a problem, with the display of the meter display 102. If the CPU 1000 judges that there are no problems and no possibility thereof in the display of the meter display 102, i.e., if there is neither a problem nor the possibility of a problem (in the case of No in S112), the CPU 1000 advances to S114. On the other hand, if the CPU 1000 judges that there is a problem or the possibility thereof in the display of the meter display 102, i.e., if there is either a problem or the possibility of a problem (in the case of Yes in S112), the CPU 1000 advances to S116.

In S114, the CPU 1000 executes display control by the general-purpose OS. Namely, in a case in which display control by the general-purpose OS has been executed up until then, the display control by the general-purpose OS is continued. In a case in which display control by the RTOS has been executed up until then, the display control is switched to display control by the general-purpose OS.

In S116, the CPU 1000 executes display control by the RTOS. Namely, in a case in which display control by the general-purpose OS has been executed up until then, the display control is switched to display control by the RTOS. In a case in which display control by the RTOS has been executed up until then, the display control by the RTOS is continued.

In S118, the CPU 1000 judges whether or not a given time period has elapsed. If the CPU 1000 judges that the given time period has elapsed (in the case of Yes in S118), the CPU 1000 returns to S112. On the other hand, if the CPU 1000 judges that the given time period has not elapsed (in the case of No in S118), the CPU 1000 repeats S118. In accordance with the present structure, if there is no problem and no possibility thereof, it is possible to return to display control by the original, general-purpose OS.

As described above, in accordance with the present embodiment, in a case in which, after display control of the meter display 102 by the general-purpose OS executing section 1008, there is a problem with the display of the meter display 102 or the possibility of a problem, display control is switched to display control by the RTOS executing section 1009. Due thereto, display for the user of the display device can be ensured even in cases in which there is a problem with, or there is the possibility of a problem with, the display of the meter display 102. In particular, in a case in which the meter display 102 is used as the display device, display that is directed toward the driver who is the user can be ensured. In accordance with the present embodiment, at the time when a driver drives the vehicle 1, display for the driver is ensured, and therefore, the present embodiment can contribute to the traveling safety of the vehicle 1.

Modified Example

In the first embodiment, at the time of controlling the display of the meter display 102, there is display control by the general-purpose OS or display control by the RTOS. However, superposed display control by both the general-purpose OS and the RTOS may be carried out.

Figure 5A:
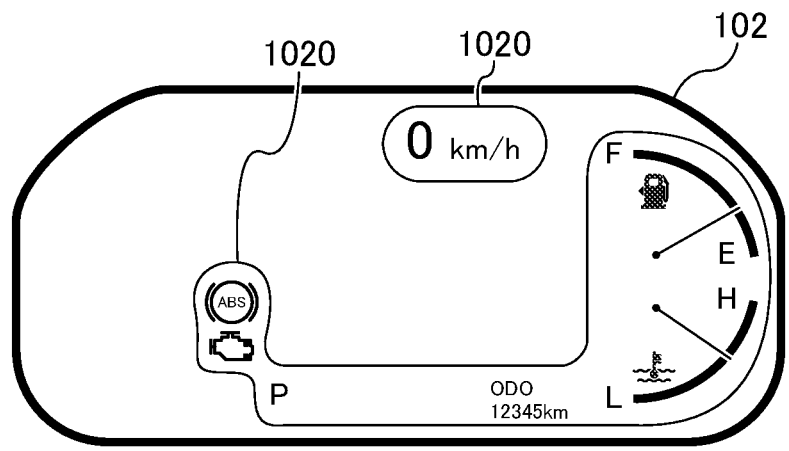
FIG. 5A is an example of a display control screen of the electronic control unit of the vehicle display device relating to a modified example of the first embodiment, and is an example of a display control screen by an RTOS executing section.

FIG. 5A is an example of a display control screen in accordance with the RTOS executing section 1009 of the electronic control unit 100 of the display device 10 for a vehicle relating to a modified example of the first embodiment. In the display control by the RTOS executing section 1009, the speed of preparing for display control is prioritized over the amount of information, and therefore, in order to carry out driving assist, the amount of information that is to be displayed on the meter display 102 is limited, and display of only some important display information 1020 is carried out. An example of the important display that is displayed by the important display information 1020 is information such as telltales expressing problems with the ABS or problems with the engine, the hazard lights, information of the current shift position, the cumulative distance travelled, the current speed, the remaining amount of gasoline, the water temperature and the like.

Figure 5B:
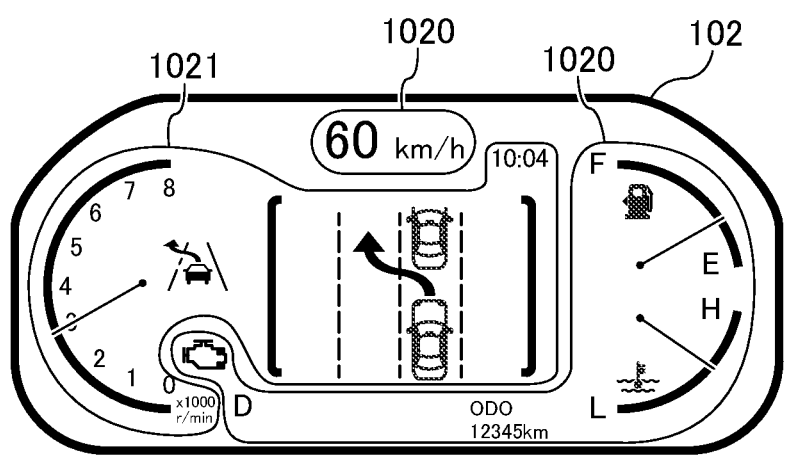
FIG. 5B is an example of a display control screen of the electronic control unit of the vehicle display device relating to the modified example of the first embodiment, and is an example of a control screen relating to superposed display by a general-purpose OS executing section and the RTOS executing section.

FIG. 5B is an example of a superposed display control screen in accordance with the general-purpose OS executing section 1008 and the RTOS executing section 1009 of the electronic control unit 100 of the display device 10 for a vehicle relating to the modified example of the first embodiment. In the superposed display control by the general-purpose OS executing section 1008 and the RTOS executing section 1009, display control by the general-purpose OS executing section 1008 is superposed on the display control of the RTOS executing section 1009 of FIG. 5A. The general-purpose OS executing section prioritizes high-level image display such as the amount of information and rendering and the like, over the speed of preparation of the display control, and therefore, display control of various information is possible, and display of generally displayed information 1021 can be carried out. Examples of the general display that is displayed by the generally displayed information 1021 include information of the tachometer, behavior predicting information of the drive assist system in 3D display, information such as the time and the like, and decorative display.

FIG. 6 is a flowchart explaining main portions of control operations of the electronic control unit of the vehicle display device relating to the modified example of the first embodiment.

Processings from S200 to S208 are similar to the processings of S100 to S108 of the above-described first embodiment. In S110 of the above-described first embodiment that corresponds to S210 that is the step that follows next, display control of the meter display 102 is carried out by only the general-purpose OS. However, in S210 of the present modified example, superposed display control, in which display control by the RTOS is added to the display control by the general-purpose OS, is carried out. Due thereto, in both the RTOS and the general-purpose OS, there is no need to carry out control for displaying similar information, and an improvement in efficiency at the time of manufacturing the manufactured product, and a reduction in the memory capacity for information, and the like are possible.

The processing of next S212 is similar to the processing of S112. Further, S214 is similar to above-described S210. The processings of S216, S218 are similar to S116, S118.

Further, although the first embodiment is structured such that the hypervisor 1007 judges whether there is a problem or the possibility thereof with the display of the meter display 102, there may be a structure in which an information processing device, which judges whether there is a problem or the possibility thereof with the display of the meter display 102, is provided separately at the exterior, and information is acquired. In accordance with this structure, decentralization of the system is possible due to the external information processing device judging whether or not there is a problem or the possibility thereof with display of the display device, and the redundancy and accuracy improve.

Further, the first embodiment is structured such that the hypervisor 1007 judges whether there is a problem or the possibility thereof with the display of the meter display 102 in S112 each time a given time period elapses. However, there may be a structure in which, in a case of acquiring fail information expressing that display control of the meter display 102 by the general-purpose OS executing section 1008 could not be carried out normally, the step of S116 is executed immediately without waiting out the given time period.

In the first embodiment, the structure in which the general-purpose OS executing section 1008 and the RTOS executing section 1009 further operate on the hypervisor 1007 that operates on hardware is an example of the system that is used at the time when the CPU 1000 switches the OS that carries out display control of the meter display 102. However, an arbitrary, known structure may be used, such as hardware being controlled indirectly through another host OS that is between the hardware and the hypervisor 1007, or the like.

In the first embodiment, there is a structure in which the general-purpose OS executing section 1008 and the RTOS executing section 1009 operate on the hypervisor 1007. However, the number of host OSs is not limited to two, and there may be a structure in which three or more host OSs operate in order to provide even more redundancy. Further, there may be a structure in which the superposed display of the modified example also is superposed display by three or more host OSs.

Although the present disclosure has been described on the basis of the respective drawings and embodiments, a person skilled in the art can easily make various modifications and changes on the basis of the present disclosure. The present disclosure is not limited to the above-described embodiments, and such modifications and changes are to be considered as falling within the scope of the present disclosure. For example, functions and the like that are included in the respective means and the respective steps or the like can be rearranged provided that they are not logically contradictory. Plural means or steps or the like may be combined into a single means or step, or may be divided so as to be carried out by plural units and/or arbitrary servers. Further, devices and methods that carry out operations relating to the present embodiments at the control processing section of the display control device for a vehicle, and programs that cause operations relating to the present embodiment to be carried out, also are included within the scope of the present disclosure.

Further, any of various types of processors other than a CPU may execute the respective processings that are executed due to the CPU 1000 reading-in software (programs) in the above-described embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described respective processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

The above embodiments describe a form in which the respective programs are stored in advance (are installed) on a non-transitory, computer-readable storage medium. For example, the program for control at the ECU 100 is stored in advance in the eMMC 1003. However, the present disclosure is not limited to this, and the respective programs may be provided in forms of being stored on a non-transitory storage medium such as a CD-ROM (Compact Disc Read Only Memory), a DVD-ROM (Digital Versatile Disc Read Only Memory), a USB (Universal Serial Bus) memory, or the like. Further, the programs may be in forms of being downloaded from an external device over a network.

What is claimed is:

1. A display control device for a vehicle, comprising:
   a memory; and
   at least one processor coupled to the memory, wherein the at least one processor is configured to:
   execute a first OS, which carries out display control of a display device installed at a vehicle and viewed by a user of the vehicle, and a second OS that carries out display control of the display device and ensures time limits of execution times of commands, and
   in a case in which there is a problem with or a possibility of a problem with display of the display device, carry out display by only control of the second OS at the display device.

2. The display control device for a vehicle of claim 1, wherein the at least one processor is configured to:
   be able to switch between display by control of the first OS and display by control of the second OS, and
   in the case in which there is a problem with or a possibility of a problem with display of the display device, carry out display by control of the second OS instead of display by control of the first OS at the display device.

3. The display control device for a vehicle of claim 1, wherein the at least one processor is configured to:
   be able to carry out superposed display of display by control of the first OS and display by control of the second OS at the display device, and
   in the case in which there is a problem with or a possibility of a problem with display of the display device, stop display by control of the first OS at the display device.

4. The display control device for a vehicle of claim 1, wherein the at least one processor is configured to, in a case in which the problem disappears, carry out display by control of the first OS at the display device.

5. The display control device for a vehicle of claim 1, wherein the at least one processor is configured to acquire information as to whether or not there is a problem with or a possibility of a problem with display of the display device, from an external information processing device.

6. A vehicle display device, comprising:
   the display device; and
   the display control device for a vehicle of claim 1.

7. A vehicle comprising:
   the display device; and
   the display control device for a vehicle of claim 1.

8. A display control method for a vehicle that is executed by a processor, the display control method comprising:
   executing a first OS, which carries out display control of a display device installed at a vehicle and viewed by a user of the vehicle, and a second OS that carries out display control of the display device and ensures time limits of execution times of commands; and
   in a case in which there is a problem with or a possibility of a problem with display of the display device, carrying out display by only control of the second OS at the display device.

9. A non-transitory storage medium storing a program executable by a processor to perform a process, the process comprising:

executing a first OS, which carries out display control of a display device installed at a vehicle and viewed by a user of the vehicle, and a second OS that carries out display control of the display device and ensures time limits of execution times of commands; and in a case in which there is a problem with or a possibility of a problem with display of the display device, carrying out display by only control of the second OS at the display device.

* * * * *